United States Patent [19]

Bornzin et al.

[11] 3,823,534
[45] July 16, 1974

[54] SICKLE BAR MOWER AND DRIVE THEREFOR

[75] Inventors: James H. Bornzin, La Grange; William C. Swanson, Clarendon Hills, both of Ill.

[73] Assignee: International Harvester Company, Chicago, Ill.

[22] Filed: Feb. 16, 1973

[21] Appl. No.: 333,421

[52] U.S. Cl. ................................ 56/296, 74/60
[51] Int. Cl. .................................... A01d 55/02
[58] Field of Search ................. 56/296, 297; 74/60

[56] References Cited
UNITED STATES PATENTS

| | | | |
|---|---|---|---|
| 3,104,511 | 9/1963 | Clark | 56/296 |
| 3,648,444 | 3/1972 | Dunn | 56/296 |
| 3,763,639 | 10/1973 | Grillot | 56/296 |

Primary Examiner—Robert Peshock
Assistant Examiner—Jay N. Eskovitz
Attorney, Agent, or Firm—Dennis K. Sullivan; Floyd B. Harman

[57] ABSTRACT

For a mower of the reciprocating type, a drive which converts rotary motion to an oscillating motion for reciprocating the mower sickle. The drive incorporates a swash plate which is pivoted on a horizontal axis to the upper end of a yoke; the lower end of which is connected through an arm to the sickle. The swash plate is driven by axially extending and retracting pistons of a hydraulic motor. The motor is capable of running the sickle at infinite speeds and the loads generated due to change of direction of the sickle at each end of its stroke are in part modulated by the hydraulic system.

13 Claims, 6 Drawing Figures

SICKLE BAR MOWER AND DRIVE THEREFOR

DISCUSSION OF THE PRIOR ART

Previous drives for converting rotary to oscillating motion required high precision wobble throws which involved costly accurately machined mountings and precision assembly practices. In types such as shown in U.S. Pat. No. 2,824,416 the axis of the input shaft, the axis of the throw and the axis of the output shaft must coincide at a common point. Only minute deviations can be tolerated in the thousanths of an inch and even such minute tolerances have had a deleterious effect not only upon the wobble connection but also upon the operational characteristics of the input and output shafts. The compounding of certain tolerances would have the effect of creating high stress loadings which could lead to early or premature failure of these parts.

SUMMARY OF THE INVENTION

This invention is concerned with a hydrostatic and/or hydraulic drive arrangement for converting rotary motion to an oscillatory motion for reciprocally driving a sickle of a mower.

A general object of the invention is to devise a novel drive for a mower comprising a wobble plate which drives an oscillating shaft, the wobble plate being driven by an associated power source.

A further object of the invention is to provide the wobble plate driven by a hydraulic motor which comprises a circular array of pistons abutting one side of the wobble plate, the pistons being sequentially extended and retracted to wobble or nutate the plate and thus impart a sickle-driving oscillating motion in a predetermined plane transversely of the axis of the motor.

An object of one embodiment is to provide a novel, compact and efficient mower drive comprising a piston type motor which is held stationarily in a mower mount housing and wherein the pistons are sequentially actuated by a rotary valve which is connected to a shaft passing through the wobble plate and connected to a reaction wobble member.

A further object is concerned with utilizing components of a fluid energy translating device in a direct coupled relation with parts of a mower drive to oscillate the sickle of a mower.

Another object of the invention is to provide a novel and effective but relatively inexpensive drive for a mower sickle.

A different object is to provide a novel drive from an axial piston motor to a sickle.

A more specific object is to provide a drive to the sickle from the axial piston motor through a swash plate which is coupled to and oscillates the output shaft which is connected to the sickle through a swinging arm.

These and other objects and advantages inherent in and encompassed by the invention will become more readily apparent from the specification and the drawings, wherein.

Figures 1, 2:
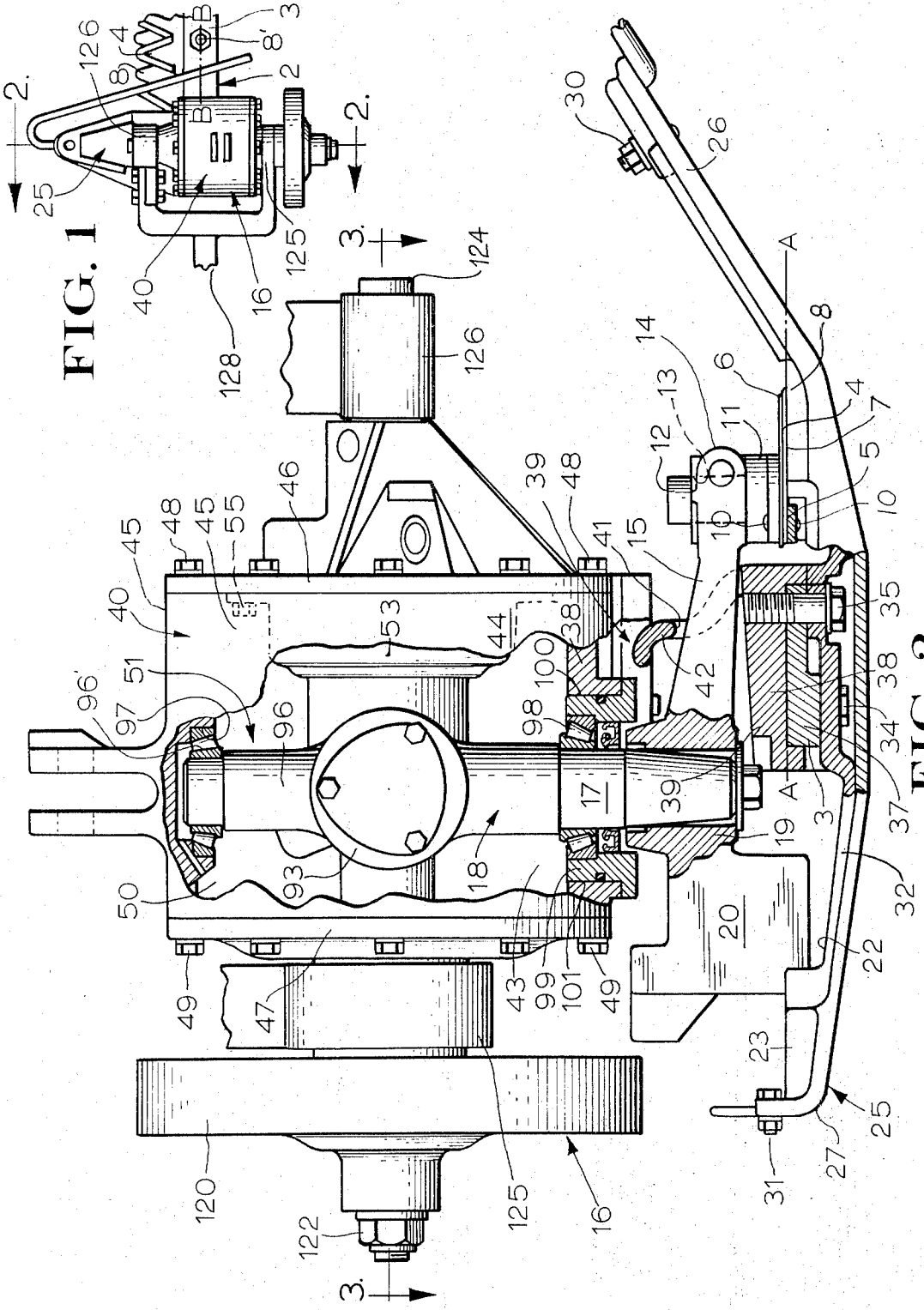
FIG. 1 is a fragmentary top plan view of a mower incorporating the invention.
FIG. 2 is an end view partly in vertical section taken substantially on line 2—2 of FIG. 1.

Describing the invention in detail, there is shown essentially a conventional mower generally indicated 2 which comprises a mower bar 3 on which is mounted for reciprocation a conventional sickle 4 for operation in a generally horizontal plane indicated A—A in FIG. 2 and on a given line indicated B—B in FIG. 1, the line, of course, being in the plane A—A. The sickle comprises a conventional backing bar or backbone 5 with knives 6 connected thereto which cooperate with ledger plates 7 which are mounted on fingers 8 which are suitably connected as by bolts 8' to the cutter bar 3 and form part thereof as will be readily understood by those skilled in the art.

The stubbleward end of the sickle 4 is connected by its backbone 5 as by rivets 10 to a knife-head 11 to which there is journaled a vertical pin or pivot member 12 which is clamped in an opening 13 in the forward end portion 14 of an output arm 15 of the sickle drive mechanism generally designated 16.

The arm 15 is connected with an upstanding lower shaft portion 17 of an output member generally indicated 18. The arm 15 has a rearwardly extending rear arm portion 19 which extends diametrically opposite to the end portion of the arm 15 and at its rearward end is provided with a counterweight 20. The counterweight as will be readily seen from a consideration of FIG. 2 is a compact mass and is formed and arranged to extend to the rear of line B—B and through the plane A—A, that is the plane of the sickle, and it will be readily observed that the center of gravity of the counterweight is preferably spaced diametrically opposite to the center of the pivot 12 with respect to the vertical axis of oscillation of the member 18. The counterweight is preferably confined within a pocket 22 formed by upstanding peripheral flange 23 which extends from an inner shoe structure generally designated 32 which is secured to the foundation or sole plate structure generally indicated 25 (FIG. 2) by bolts 30 and 31. It will be seen that the inner shoe structure 32 overlies the sole plate 25 and intermediate its ends is fastened as by bolts 34 and 35 to an inner or stubbleward end portion 37 of the cutter bar 3 and also to a bottom transverse web 38 of a base portion or section 39 of a housing generally indicated 40. Housing 40, which encloses drive member 18 has a forward opening 41 formed in forward wall 42 for accommodating the extension of the output arm 15. It will be seen that the housing in addition to the transverse intermediate wall 38' comprises inboard and outboard wall portions 43 and 44 and a top wall portion indicated 45. Front and rear cover plates 46 and 47 are bolted as at 48 and 49, respectively, to the front and rear edges of the top and bottom and sidewall portions of the casing to provide an enclosure compartment 50 for motion converting drive mechanism 51.

Figure 4:
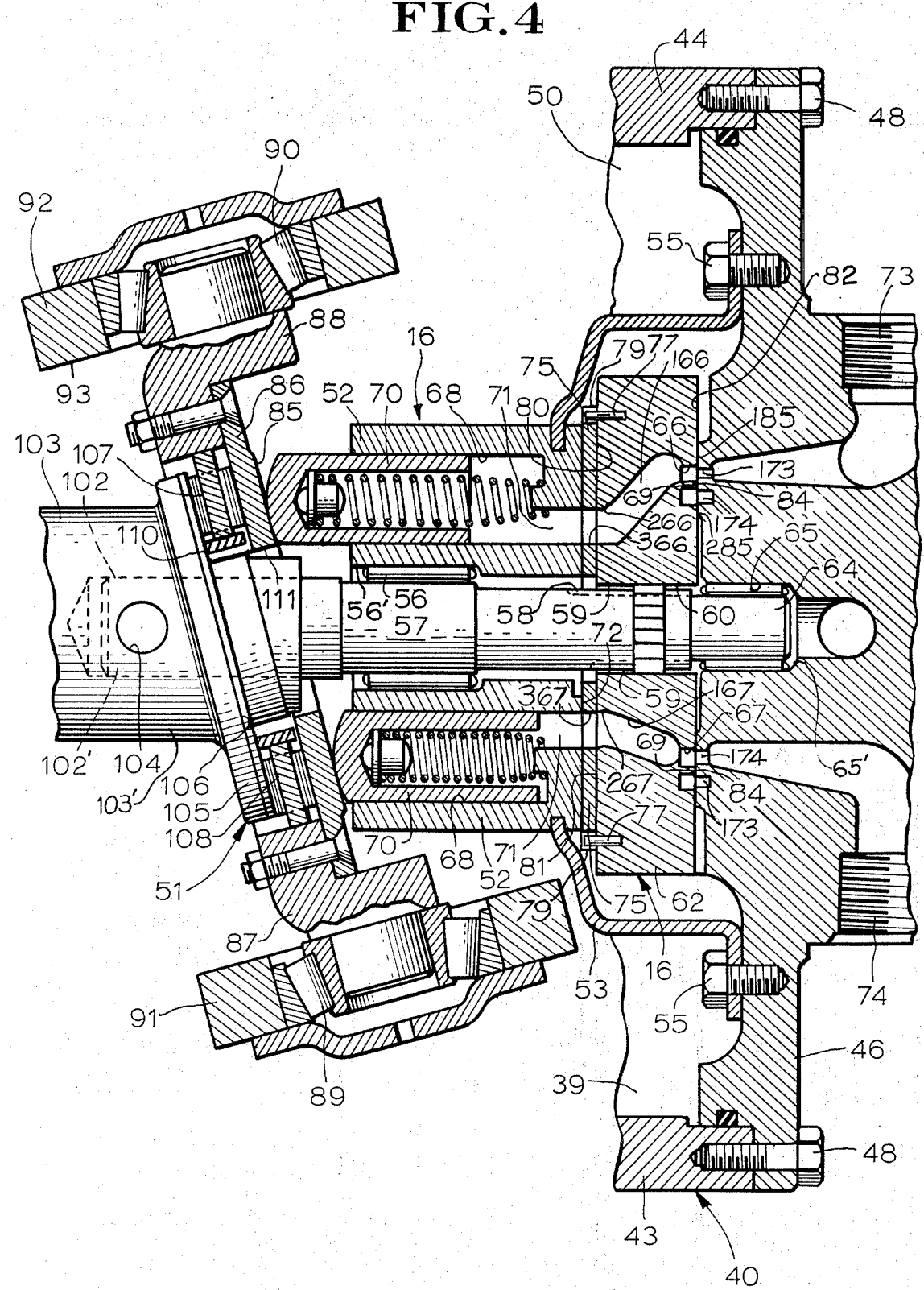
FIG. 4 is an enlarged view of a portion of the section shown in FIG. 3.
Figure 5:
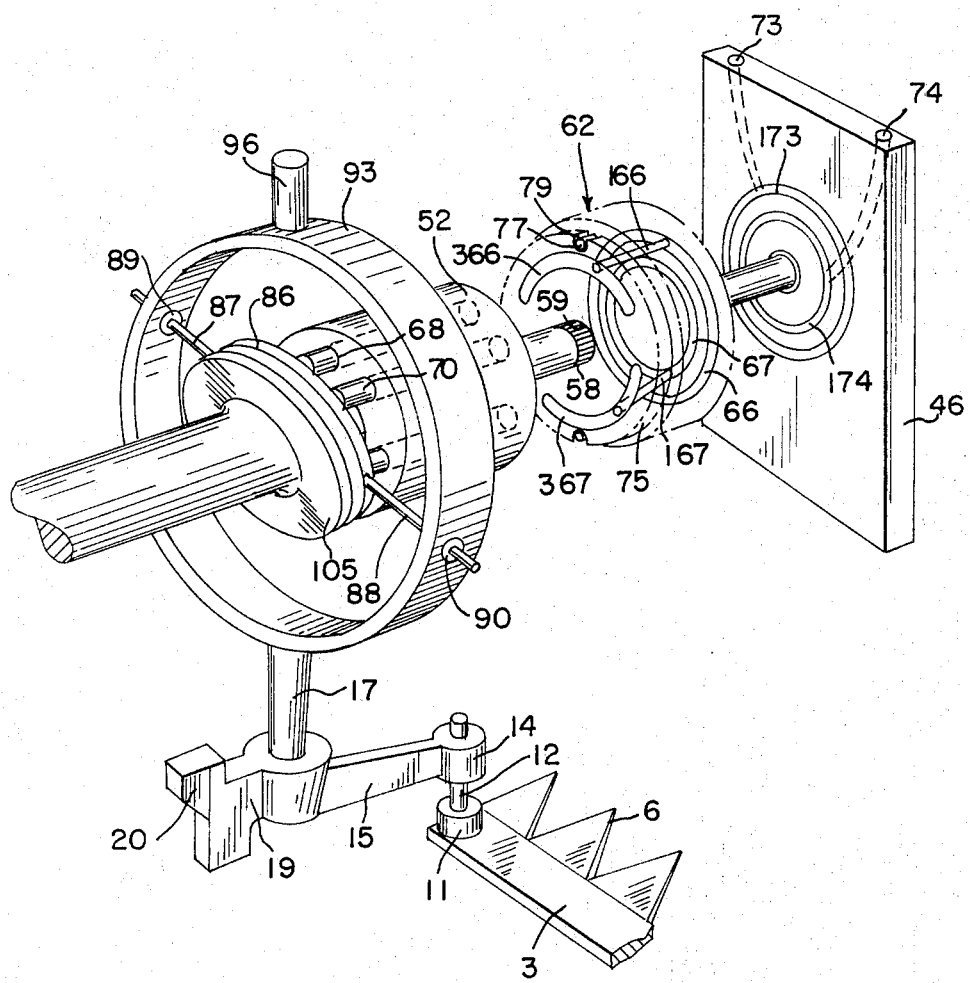
FIG. 5 is a schematic view of the mower drive.

Referring now to FIG. 4, the drive mechanism 51, comprises a cylinder block 52 fitted to and interlocked against rotation with an anchor mount 53 which is secured by bolts 55 to the cover plate 46. The cylinder block 52 is held stationarily and mounts a bearing 56 in a center bore 56' rotatably supporting a valve drive shaft 57. Shaft 57 has a splined portion 58 interlocked with splines 59 in a center opening 60 of a rotary valve plate element 62. The end 64 of the shaft 57 is journaled in a bearing 65 in opening 65' in the plate 46. The rotary valve plate element 62 is provided with an outer annular groove 66 and an inner annular groove 67 formed in the sealing face 82. Annular grooves 66 and 67 are concentric to shaft 57 and are separated by an annular land 69. A first kidney shaped port 266 and a second kidney shaped port 267 are formed in the other face 81 of rotary valve plate element 62. An outer passage 166 connects outer annular groove 66 to first kidney shaped port 266 to thus provide for the flow of hydraulic fluid therebetween. An inner passage 167 connects inner annular groove 67 to second kidney shaped port 267 to thus provide for the flow of hydraulic fluid therebetween. The rotary valve plate element 62 is provided with a wear and sealing disk 76 connected to element 62 by pins 77 protruding from face 81 and extending into openings 79 formed in disk 75. This connection prevents relative rotation between element 62 and disk 75. Disk 75 has a first kidney shaped port 366 aligned with port 266 a second kidney shaped port 367 aligned with port 267.

Cylinder block 52 has a plurality of axially extending bores 68 formed therein arranged concentric to shaft 57. Each bore 68 has a smaller port 71 extending from valve engaging face 72 to the associated bore 68. The openings of ports 71 in face 72 are concentric with shaft 57 and are aligned with kidney shaped ports 366 and 367. Each bore 68, contains a reciprocally movable piston 70. Rotation of the valve plate 62 provides alternate communication of the bores 68 via ports 71, 366, 266, passage 166, groove 66 or ports 71, 367, 267, passage 167, groove 67 with fluid inlet passage 73 and outlet passage 74. Direction of rotation of the valve plate may be reversed wherein conduits 73 and 74 would be outlet and inlet passages, respectively.

Passages 73, 74 are provided in the cover plate 46 and communicate with annular grooves 173 and 174 formed in plate 46. Annular grooves 173, 174 are located such that they communicate with annular grooves 66, 67, respectively. Annular grooves 173 and 174 are separated by an annular land 84.

It should be noted that annular land 84 is wider than annular land 69 and that the entire surface of annular land 69 is contained within the confines of annular land 84. Outer annular land 185 and inner annular land 285 are formed on cover plate 46 adjacent annular grooves 173 and 174, respectively. The surface of annular lands 185, 84 and 285 that engage annular land 69 and surface 82 of rotary valve plate 62 are lubricated by a film of hydraulic fluid that seeps from annular grooves 66, 67, 173 and 174. The hydraulic fluid seeping between rotary valve plate 62 and cover plate 46 is under pressure and exerts a force on rotary valve plate 62 toward the cylinder block 52. This force tending to move rotary valve plate away from cover plate 46 is counteracted by the hydraulic pressure acting against the bottom surface of bores 68. The force acting against the bottom surface of bores 68 must always be greater than the opposing force so that the cylinder block 52 is held against valve plate 62 and valve plate 62 is held against cover plate 46. This is accomplished by designing the system such that the force created by the hydraulic pressure in the minimum number of bores 68 on pressure at any one time is greater than the force generated by the hydraulic pressure in annular grooves 66, 67, 173 and 174.

The pistons 70 are spring loaded outwardly and engage one side 85 of a swash plate 86 which is connected to a pair of trunnions 87, 88 pivotally mounted in bearings 89, 90 which are drivingly fitted into the respective arms 91 and 92 of yoke 93 which is connected at its lower end to lower shaft portions 17 and at its upper end to an upper shaft portion 96. Upper shaft portion 96 is pivotally mounted in a bearing 96' which is fitted in a bearing cup 97 provided on the underside of the top wall portion of the housing. The lower portion 17 of the oscillating shaft is carried in a bearing 98 which is mounted in a flanged cup 99 secured as by pressfitting at 100 to the wall 38' of the housing in the opening 101. Thus a wobble plate made up of the swash plate 86 and pair of trunnions 87, 88 is pivotally mounted about a horizontal axis upon yoke 93 which is journaled for oscillation upon housing 40 about a vertical axis.

End 102' of shaft 57 extends into a center bore 102 in the inner end portion 103 of a coaxial shaft 103' and is joined thereto as by a pin 104. The inner end portion 103 is formed with a cam plate 10 having a wobble surface 106 opposing a parallel surface 107 on the back side of the swash plate 86 and between the surfaces 106 and 107 there is interposed a thrust bearing assembly 108. The bearing assembly's inner race 110 and the aperture 111 in the swash plate are dimensioned oversize with respect to the diameter of the shaft 57 to accommodate nutating motion of the bearing assembly 108 and the swash plate. The wobble surface 106 and bearing assembly 108 provide a backing for the swash plate. The shaft 103' rotates with shaft 57 and extends through a journal 115 formed on cover plate 47 and is mounted on bearings 116, 117 which are closely fitted into the journal 115. On the free end of the shaft 103' there is mounted a flywheel 120 which is keyed thereto as at 121 and secured thereon by a nut 122 threaded as at 123 to shaft 103'.

The journals 115 and 124 on plates 47 and 46 provide coaxial pivots for arms 125, 126 of a coupling arm assembly 128 which provides a conventional mounting to a tractor or mower support frame as well known to those skilled in the art.

Figure 3:
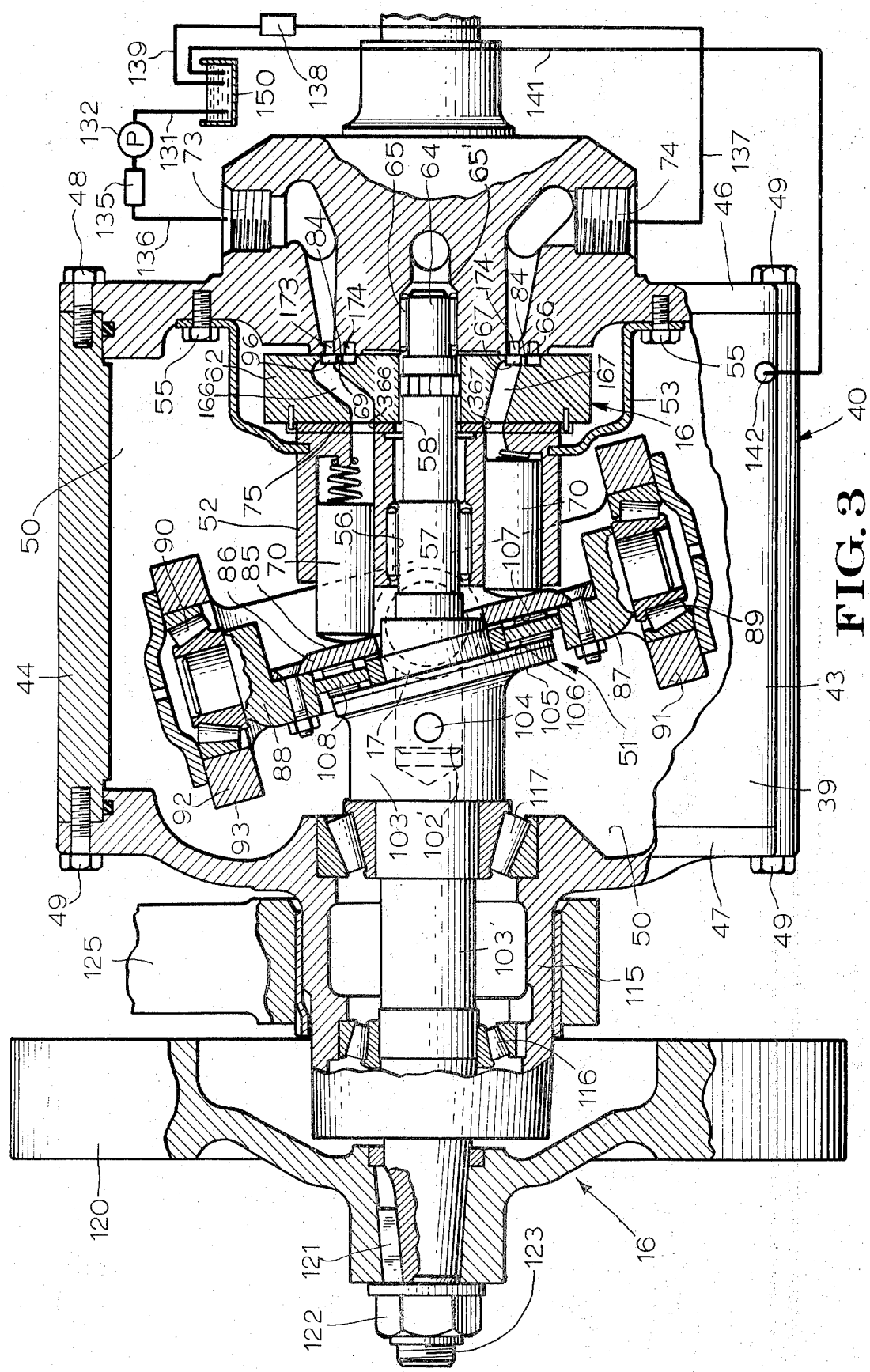
FIG. 3 is a horizontal sectional view taken substantially on line 3—3 of FIG. 2.

As best seen in FIG. 3, the fluid is drawn from a sump 150 via line or hose 131 to the suction side of a fixed or variable delivery pump 132 which on its pressure side delivers fluid under pressure through a control valve 135 to the pressure line 136 which is connected to port 73.

Port 74 is connected to the exhaust line 137 which is connected via the valve 138 to the sump line 139 which exhausts into the sump.

It will be noted that the sump 150 is connected by a line or hose 141 to the housing port 142 to drain off leakage fluid which tends to fill up the housing.

THE EMBODIMENT OF FIG. 6

Figure 6:
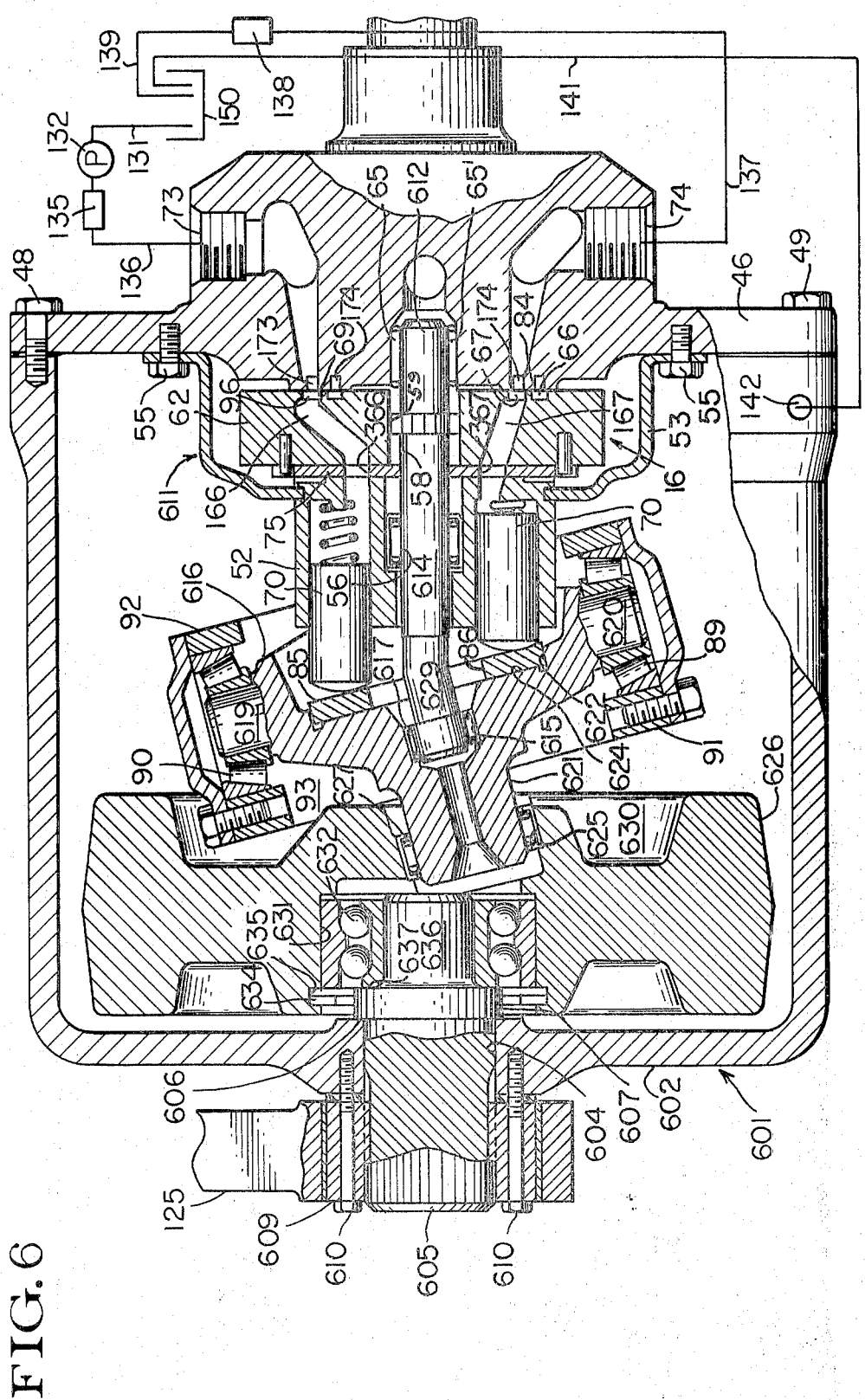
FIG. 6 is a horizontal sectional view similar to FIG. 3 but illustrating a second embodiment of the invention.

A second embodiment of applicants' sickle drive is presented in FIG. 6. In this embodiment the flywheel is located within the housing and the wobble plate and shaft have been changed to a bent-shaft configuration. The piston drive mechanism, the trunnion mounting of the wobble plate in the yoke, the mounting of the sickle drive thereto, and the mounting of the mechanism on the mower are intended to be similar to that presented in the previous embodiment. Reference numerals of components common to both embodiments are retained in the drawings and in the following description.

Turning to FIG. 6, there is shown a housing generally designated 601 having a forward wall 602 with a centrally located forward hole 604 to receive flywheel mounting shaft 605 which is press fit therein up to land 606 formed by diameter 607 of the shaft which is larger than the opening 604. At its forward end, the shaft 605 is splined to receive collar 609 which is complementally matingly splined and has holes therein permitting it to be fixed to the housing 601 by bolts 610. Thus the shaft 605 is restrained from axial and rotational movement by the press fit and is further restrained from rotational movement by the collar 609 which additionally forms a front pivot to receive the arm 125 of coupling assembly 128.

The housing 601 is otherwise similar to the housing 40 of the previous embodiment including walls 38' 43, and 44 thereof (see FIG. 2). The rear cover plate 46 is bolted to the housing 601 as at 48 to complete the enclosure.

The piston drive assembly 611 is also the same as the previous embodiment and includes the cylinder block 52, the rotary valve plate 62, and the piston 70 in fluid communication with the rear plate 46, all as is described in detail above. The drive shaft 614 is similar in that the rear portion 612 is journaled in the rear plate 46 by bearing 65 and in the cylinder block 52 by bearing 56 and is provided with a splined portion 58 which matingly engages splines 59 in plate 62. However, just forward of the cylinder block 52, shaft 614 is bent at an oblique angle to the axis of the cylinder block 52 and extends diagonally forward to a central bore 615 in wobble plate 616 whereat it is slidably rotatably mounted therein by needle bearing 617. The wobble plate 616 comprises a pair of coaxial trunnion shafts 619 and 620 diametrically disposed about the central bore 615 which are pivotally mounted in bearings 89 and 90 drivingly fitted into the respective arms 91 and 92 of yoke 93, and further comprises forwardly extending shaft portion 621 coaxial with the central bore 615. The central bore 615 abruptly widens rearwardly to a coaxial bore 622 thereby forming land 624 substantially perpendicular thereto. The swash plate 86 is received in bore 622 against the land 624 and is preferably press fit therein, the rear side 85 of the swash plate 86 being engaged by the outwardly spring-loaded pistons 70.

The forward shaft portion 621 of wobble plate 616 extends forwardly therefrom into a complementary bore 625 in the flywheel 626 wherein it is slidably rotatably mounted by needle bearing 627, the bore 625 being coaxial with the shaft 621 and central bore 615 of the wobble plate 616 and with the forward portion 629 of the shaft 614. The flywheel 626 contains an annular pocket 630 at its rear to receive the forward portions of the yoke arms 91 and 92 thereby preventing interference therebetween. At its forward end, the flywheel 626 contains a central bore 631 which slidingly receives roller bearing 632 which is loosely retained therein by snap ring 634 mounted in groove 635. Roller bearing 632 is pressed onto the rear end 636 of shaft 605 against the land 637 formed by diameter 607 to mount the flywheel 626 to the shaft 605. It will be noted that all of the bearing mountings in the axial direction of the flywheel 626 and the wobble plate 616 are slidable to permit axial movement. This is done to permit the flywheel 626 and shaft 614 to self-align themselves to operation with the wobble plate 616, the wobble plate 616 itself being restrained from axial movement by the arms 91 and 92 of yoke 93 which is rotatably mounted to the housing 601 transversely of the longitudinal axis of the drive mechanism.

It will be appreciated that the fluid connections for this embodiment are the same as shown in the previous embodiment.

In operation, when fluid pressure is applied to some of the pistons 70 through conduits opened by the valve 62, the pressure of those pistons against the swash plate 86 create an unbalanced force causing the wobble plate 616, the forward end 629 of the shaft 614, the forward shaft 621 of the wobble plate 616, and the bore 625 of the flywheel 626 to nutate with respect to the axis of the rear portion 612 of the shaft 614 and also causes the shaft 614 to rotate the valve plate 62 with respect to the cylinder housing 52 and the flywheel to rotate on shaft 605. The rotation of the valve plate 62 causes the piston 70 to be sequentially activated and de-activated thus causing a continuation of the drive as long as pressure is available at the valve plate. The nutation of the wobble plate 616 causes the yoke 93 to oscillate thereby driving the sickle in a reciprocating fashion.

While two embodiments of the invention have been shown it should be recognized that other forms and variations could exist without departing basically from the broad general principles herein disclosed. It should therefore be understood that while the above embodiments have been described with the view of clearly and concisely illustrating the principles of the invention, it is desired not to limit or narrow the invention beyond that which is claimed.

What is claimed is:

1. In a mower of the type comprising a mower bar and a sickle reciprocal thereon, a housing mounted on said mower bar, a substantially horizontal drive shaft mounted from the housing for rotation on an axis extending transversely of the line of reciprocation of the sickle, a vertical output shaft having a lower end at one side of said line, an arm connected to said lower end of the output shaft and swingable in an arc in a generally horizontal plane and extending from said output shaft and terminating in a distal end portion over an adjacent end of the sickle, means pivotally connecting said distal end of the arm to said adjacent end of the sickle, swash plate means, means pivotally mounting said swash plate means on the output shaft on an axis extending transversely of the axis of rotation of the drive shaft, a cam plate connected to said drive shaft for rotation therewith and an axial piston motor engaging said swash plate means for angulating the same to effect oscillation of the output shaft, said swash plate means and said motor having relative sliding movement transversely of the axis of rotation of the drive shaft.

2. In a drive for a mower having a mower bar and a sickle reciprocable thereon, a support adapted for connection to said mower bar, an output element mounted on the support for oscillation about a substantially vertical axis, diametrically extending arms on said element, a counterweight directly mounted on one arm, means pivotally connecting the sickle to the other arm, a swash plate pivotally mounted on said element on an axis extending transversely of said axis of oscillation of said element, and drive means comprising actuating means abutting one side of said swash plate and operative to drive said swash plate to effect oscillation of said output element, said actuating means comprising a hydraulic motor, having a housing on said support and having an annular array of pistons reciprocable within the housing and oriented about an axis extending transversely to said pivot axis of said swash plate and abutting said one side of said swash plate.

3. The invention according to claim 2 and a rotary valve mounted to said housing coaxial to said axis extending transversely to said pivot axis for sequentially porting fluid to and exhausting fluid from said pistons, and means for driving said valve from said swash plate.

4. The invention according to claim 3 and said means for driving said valve comprising a shaft coaxial with said rotary valve axis and extending through an aperture in said swash plate, and reaction means abutting the side of the swash plate opposite to the side engaged by said pistons.

5. The invention according to claim 4 and said reaction means comprising means providing a thrust receiving surface on said shaft and thrust delivering means between said swash plate and said receiving surface.

6. The invention according to claim 5 and flywheel means connected to said shaft for sustaining rotation thereof.

7. The invention according to claim 3 and said means for driving said valve comprising a shaft having a portion coaxial with said rotary valve axis and a portion having an oblique angle thereto extending through an aperture in said swash plate, and reaction means abutting the side of the swash plate opposite to the side engaged by the pistons and rotatably receiving said shaft.

8. The invention according to claim 7 and said reaction means comprising a wobble plate pivotally connected to said output element and having a forward shaft portion rotatably mounted in flywheel means at said oblique angle, said flywheel means being rotatably connected to said housing and being coaxial with said rotary valve axis.

9. In a mower having a cutter bar and sickle reciprocal thereon, a housing adapted for mounting on the cutter bar, output means mounted on the housing for oscillation about a substantially vertical axis and having a connection with the sickle for reciprocating the same, motion converting means coupled with said output means, and means for driving said motion converting means comprising an axial piston type motor including a cylinder block supported within the housing and comprising pistons adapted to be sequentially extended and retracted with respect to said block, and a swash plate disposed in driven relation by the pistons and in driving relation to the output means.

10. The invention according to claim 9 and said motor comprising a rotary valve communicating with the cylinders in said block for porting fluid from an associated pressure source and exhausting the fluid to an associated sump with attendant reciprocation of said pistons, and means for rotating said valve from said swash plate.

11. The invention according to claim 10 and inertia means coupled with said rotating means for modulating pressure surges in the system supplying pressurized fluid to said pump.

12. In a cutting device which includes a mower bar and a sickle reciprocal thereon, the improvement in drive means for the sickle comprising:
hydraulic motor means of the axial piston type, flexible fluid conduit means for delivering pressurized fluid from a fluid source to and from said motor means;
motion converting means driven by said motor means through sequential axial extension and retraction of the pistons of said motor means;
oscillating output means driven from said motion converting means and connected with said sickle for reciprocating the same; and
rotatable high inertia means driven by said motor through said motion converting means and having a mass of sufficient magnitude to minimize excessive pressure surges in the pressurized fluid and modulate forces generated by the motion converting means and change of direction at each end of the stroke of reciprocation of the sickle.

13. The invention according to claim 12 and said motion converting means comprising a swash plate disposed in driven relation to said pistons and pivoted on said output means on an axis extending transversely of said pistons and the axis of oscillation of said output means.

* * * * *